UNITED STATES PATENT OFFICE.

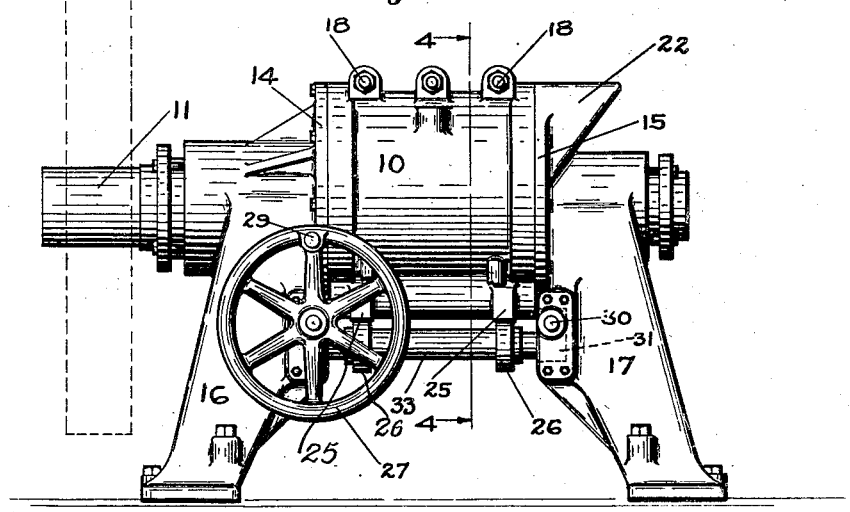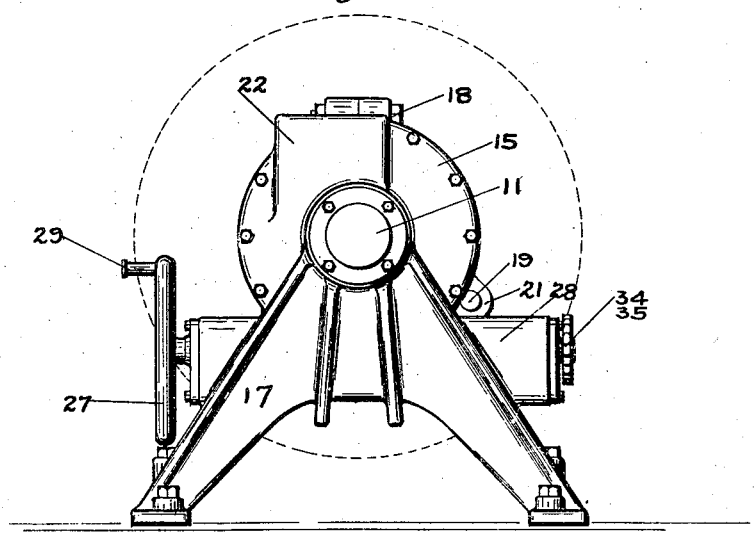

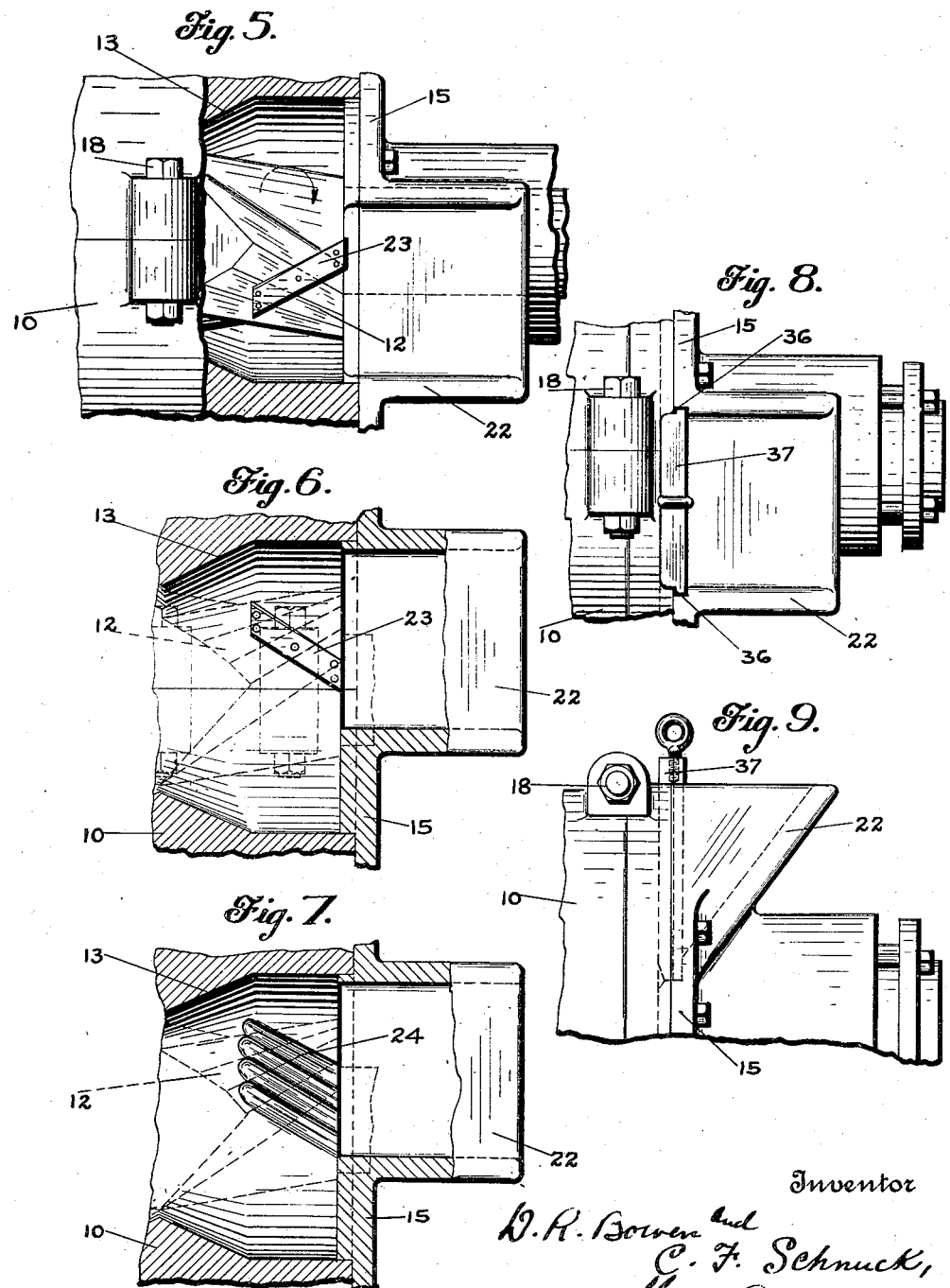

DAVID R. BOWEN AND CARL F. SCHNUCK, OF ANSONIA, CONNECTICUT, ASSIGNOR TO FARREL FOUNDRY AND MACHINE COMPANY, OF ANSONIA, CONNECTICUT, A CORPORATION OF CONNECTICUT.

MACHINE FOR TREATING RUBBER OR OTHER PLASTIC MATERIAL.

1,420,959. Specification of Letters Patent. Patented June 27, 1922.

Application filed July 11, 1919. Serial No. 310,020.

*To all whom it may concern:*

Be it known that we, DAVID R. BOWEN and CARL F. SCHNUCK, both citizens of the United States, and both residing in Ansonia, county of New Haven, State of Connecticut, have invented certain new and useful Improvements in Machines for Treating Rubber or Other Plastic Material, of which the following is a full, clear, and exact description.

This invention relates to machines for mixing or masticating heavy plastic material, and it has particular application to rubber compounding machines.

In previous applications we have described and claimed mixers or masticators of the general type wherein a bladed rotor for mixing the material works the same back and forth in a working chamber, which is provided at the end with an opening for the introduction of the ingredients to be treated. One of the heads of the working chamber or cylinder is provided with a hopper communicating with an opening in the end wall or head, and the rotor is provided adjacent the hopper with a blade or blades which have a tendency to draw the material into the chamber as the rotor rotates.

One of the primary objects of our present invention is to furnish a machine of this general type, wherein provision is made for the introduction of the material into the working chamber in a convenient, efficient and expeditious manner.

Another object is to provide means for expediting the passage of the material from the charging opening or hopper to the middle part of the chamber so that such material will be quickly drawn away from the discharge portion of the hopper, whereby fresh material in the hopper will be free to take its place, and whereby any possible tendency of the material to push or pass outwardly after being once introduced into the working chamber will be overcome or minimized.

Another object is to furnish simple, convenient, efficient means for effecting the discharge of the treated material from the working chamber and for closing the chamber tightly when it is desired to treat a new batch of material.

The invention also purposes the provision of improved means for preventing powder or dust from blowing out of the working chamber during the mixing operation.

To these and other ends, the invention consists in the novel features and combinations of parts to be hereinafter described and claimed.

In the accompanying drawings:

Fig. 1 is a front elevation of a mixer or masticator embodying our improvements.

Fig. 2 is an end elevation of the same.

Fig. 5 is an enlarged fragmentary plan view with a part of the casing broken away.

Fig. 6 is a detail horizontal section of one end portion of the machine, looking upward, the rotor being shown in dotted lines.

Fig. 7 is a view similar to Fig. 6 showing a somewhat modified construction.

Fig. 8 is a fragmentary top plan view of a somewhat modified form of machine; and Fig. 9 is a front elevation of the parts shown in Fig. 8.

Figure 3:
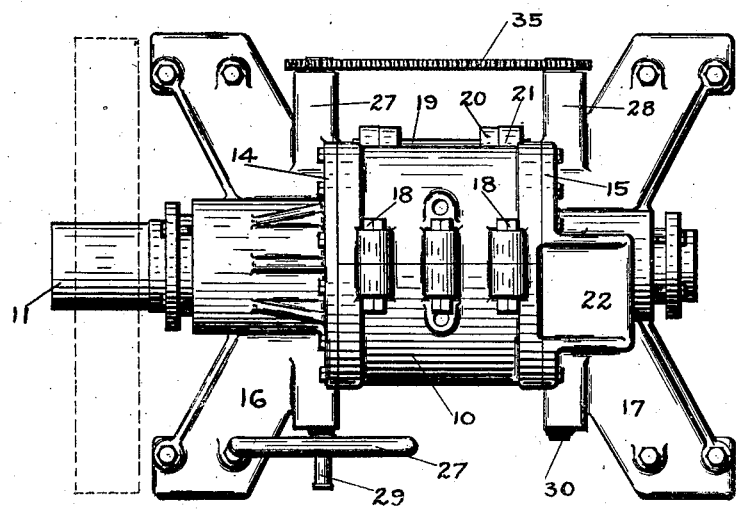
Fig. 3 is a top plan view.

The machine selected for illustration comprises a casing 10, which in this instance is of generally cylindrical shape and provides a working chamber or cylinder. Journalled in the working chamber is a horizontal shaft 11 having blades 12 operating in the respective end portions of the chamber. Only one of the blades is shown in the drawings. In addition to the blade 12, shown in Fig. 4, the rotor can have a similar but diametrically arranged blade operating in the other end of the chamber. The blades' working faces are so formed as to mash the material against and smear it over the interior surface of the chamber, so as to mix the ingredients; and the blades are arranged on the shaft at such an angle that one blade forces the material from one end of the chamber into the other end thereof, whence it is taken up and forced back again into the first end of the chamber by the other blade, this operation being repeated indefinitely as long as the blades revolve. The number of blades employed for working the material in this manner may, of course, be varied, but in the present description it will be assumed that the rotor has only two blades located in the respective end portions of the working chamber. The intermediate portion of the working chamber may be provided with a constriction in the form of an extrusion rib 13, as described and claimed in our application, Serial No. 191,413.

Figure 4:
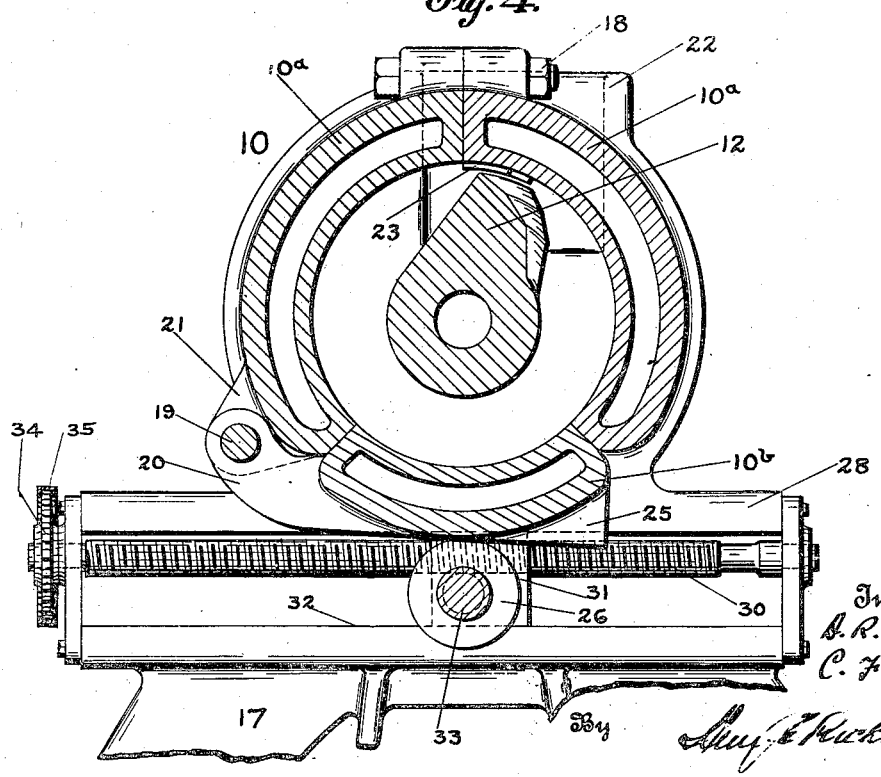
Fig. 4 is an enlarged section on line 4—4 of Fig. 1.

In the form shown, the casing 10 comprises a plurality of curved sections interposed between and secured to heads 14, 15, that are formed integral with end frames 16, 17 having legs which rest on the floor. The bearings for the shaft 11 are carried by the end frames. The shaft can be driven in any suitable manner. The curved casing sections constituting the side wall of the mixing cylinder may comprise two fixed sections 10$^a$ meeting each other at the top of the casing, and a movable discharge section 10$^b$ at the lower part of the chamber. The sections 10$^a$ may be bolted together at the top by bolts 18. The discharge section 10$^b$ is of the swinging or pivoted type. In its closed position, as shown in Fig. 4, it lies partly to one side of the longitudinal axis of the cylinder and partly on the other side. It is hinged to one of the sections 10$^a$ by a suitable hinge, which in this case includes a pintle rod 19 passing through registering openings in ears 20 on the discharge section and in ears 21 on one of the other cylinder sections.

The charging opening, in the present example, is located in the head 15. It is formed at the bottom of a hopper 22, which is preferably integral with the head 15. The hopper is preferably at the upper part of the head, somewhat to one side of the longitudinal center line of the machine, as shown in Fig. 3. The hopper has an inclined bottom, and its inner side is open so that material sliding down on the hopper bottom may pass freely into the mixing cylinder in a direction generally lengthwise of the latter. As will be seen from Fig. 5, the direction of rotation of the rotor is such that the blade adjacent the hopper has a tendency to pull in the material and to force it toward the center of the mixing chamber. As the rotating blade picks up the material which has passed into the chamber and forces it towards the center of the chamber, material in the hopper is free to pass by gravity into the vacant space or void at the rear of the rotating blade. In this manner, the machine is charged by gravity without the necessity of providing any pressure element other than the rotor itself. However, in order to expedite the inward movement of the material in the chamber and prevent any tendency for it to push out or pile up at the entrance of the chamber, viz, at the bottom of the hopper, it has been found desirable to employ an instrumentality cooperating with the rotor in the manner now to be described. Obviously, the most expeditious way of getting the incoming material from the charging opening to the central portion of the chamber is to move it in as straight a line as possible. If this is done, the material is quickly gotten out of the way of other material located behind or above it on the hopper bottom. In order to cause the material to pass toward the center of the chamber in a direct manner, instead of moving around with the rotor, we prefer to provide the chamber wall with means for obstructing passage of the material around the chamber wall and, on the other hand, facilitating the passage of the material under the influence of the rotating blade toward the middle of the chamber. This means may consist of one or more straps 23 screwed or otherwise suitably secured to the chamber wall adjacent the hopper, as shown in Figs. 5 and 6. In these figures, a single strap 23 is shown applied to the upper part of the cylindrical working chamber wall in an inclined position relatively to the longitudinal center line of the machine. In Fig. 5, which is the top plan view, the upper part of the casing is broken away to disclose the position of the strap. It will be noted that it is so located as to lie almost at a right angle to the rotor blade. It clears the tip of the rotor blade with a slight clearance, as shown in Fig. 4, and its location is such as to deflect incoming material in an inclined direction from a point near the longitudinal median line of the cylinder toward the outside. The strap or rib has the function of concentrating the material in front of the rotor blade and preventing its slipping by the tip of the blade, and at the same time, its inclination is such as to cause the material to be forced toward the middle of the chamber (where the rib 13 is located) in an approximately straight line. At any rate, the material is deflected so that it passes in a direct manner from the extreme end of the chamber to a point intermediate the chamber ends. Thus the entering material is carried quickly away from the charging opening, and additional fresh material is permitted to enter.

In Fig. 7, we have shown a modification of this feature wherein the head of the wall, instead of being provided with a separate strap, is provided with a plurality of integral ribs 24, which serve substantially the same function. These ribs have a tendency to prevent passage of the material around with the rotor, while at the same time leading it directly from the hopper to a point intermediate of the ends of the chamber.

The mechanism for controlling the discharge of the machine is as follows:

At different points in its length, the swinging discharge section 10$^b$ is provided at its lower part with transversely arranged abutments 25. These extend on both sides of the longitudinal median line of the machine, as shown at Fig. 4, and their lower surfaces are inclined rearwardly and upwardly to a slight extent. These lower surfaces are adapted to be engaged by cam rollers 26 movable forwardly and rearwardly of the machine by rotation of a hand wheel 27 at the front of the machine. The rollers 26 have a camming action on the abutments 25, so as to force the hinged section 10$^b$ to the closed position when the cam rollers are moved forwardly; and when the rollers are moved rearwardly, i. e., toward the left of Fig. 4, the discharge section is free to open by gravity. The end frames of the machine are provided with transversely extending yokes 27, 28, in which are journaled transversely arranged threaded spindles 29, 30. The hand wheel 27 is keyed to the front end of the spindle 29. Blocks 31 in the nature of nuts have threaded engagement with the respective spindles and are arranged to travel in guide openings or ways 32 in the yokes. A cross-rod 33 connects the two nuts or blocks 31 and the rollers 26 are rotatably mounted on the rod 33 in alignment with the respective abutments 25. At the rear of the machine each of the threaded spindles 29, 30 is provided with a sprocket 34, and a chain or belt 35 runs over the sprockets, so that when the spindle 29 is turned by the hand wheel 27, the other spindle 30 will be correspondingly turned. In this manner, both of the blocks or nuts 31 will be moved in the same direction, carrying the rod 33 with its cam rollers forwardly or rearwardly, as the case may be, while maintaining the parallelism of said rod with the longitudinal axis of the machine.

It will be understood that by turning the hand wheel in one direction, both of the cam rollers will be moved rearwardly so as to move them away from the abutments 25, and thereby permit the door 10$^b$ to swing downward under its own weight to an extent sufficient to permit the discharge of the treated material. After the machine has been discharged, the hand wheel is rotated in the opposite direction so as to move the cam rollers forwardly. As they move forwardly, they engage the abutments 25 in such a manner as to force the door 10$^b$ upwardly into its closed position. When the door has been tightly closed, it will remain in that position until the hand wheel is again operated.

In the modification shown in Figs. 8 and 9, the machine is provided with means for closing off the hopper from the working chamber. This is desirable in some cases during the operation of the machine for the purpose of preventing dust from being blown out of the casing, which is apt to occur under certain conditions when a considerable amount of powder is being mixed with the rubber. In the form shown in Figs. 8 and 9, a transversely movable door or closure is provided for closing the charging opening at the lower end of the hopper. For this purpose, that portion of the machine which is adjacent the juncture of the hopper with the casing is provided with upright grooves or guide ways 36, in which a closing plate 37 is vertically movable. The plate 37 can be lifted entirely out of the guides 36, when it is desired to charge the machine, but after the charging has taken place, it is reinserted in said guides, and permitted to drop down to the position shown in Fig. 9. In this position the casing is completely closed, so that no appreciable amount of dust can be expelled. While the plate 37 is free to slide up and down in its guides, it fits accurately against the edges of the charging opening when the plate is in its lowermost position, and cuts off the hopper completely from the mixing chamber.

It will be obvious that in the use of the machine, the plate or door 37 may be very readily dropped into place to close the charging opening either temporarily or throughout the mixing operation. For example, where the machine is used as a compounding machine, this closure may be placed in the operative position after the rubber has been introduced into the chamber and before the powder is introduced, to close the chamber during preliminary mixing of the rubber, if that is desirable; or it may be placed in the operative position only after the powder, as well as the rubber, has been introduced into the chamber. The particular procedure will obviously be dictated by conditions. One of the advantages of the arrangement, however, consists in the fact that after the charging opening has been closed additional material can be placed in the hopper so as to remain there until the machine is ready for it, whereupon, on moving the closure to the inoperative position, such additional material will be free to pass into the chamber, either by gravity or otherwise. The plate or other closure serves in effect as a removable partition between the hopper and the mixing chamber which can be moved to the inoperative position very readily while the hopper is full or partly full of material.

Various changes may be made in the details of the construction without departing from the scope of our invention, as set forth in the claims.

We do not claim broadly herein a machine of the single cylinder type having blades for working the material back and forth in the cylinder, as claimed in our application Serial No. 458,222; nor do we claim broadly herein a rubber working or similar machine comprising an elongated hollow single cylinder provided with a substantially continuous circumference and with an end charging opening through which the materials to be mixed move by gravity directly into the chamber, in combination with means for working the material back and forth in said chamber, as claimed in our divisional application, Serial No. 535,651; nor do we claim herein features of construction pertaining to the casing and rotor bearings, as claimed in our application, Serial No. 423,365; nor do we claim herein the transverse extrusion rib extending continuously around the circumference of the chamber, as claimed in our application, Serial No. 341,141; nor do we claim herein the method of mixing rubber or similar material, which comprises forcing the same through a restricted extrusion opening, as claimed in our application, Serial No. 223,537.

What we claim is:

1. In a machine of the character described, a working chamber, a rotor for working the material back and forth in said chamber, said chamber having provision at the end for the introduction of the material, and means for assisting the movement of the material from the end of the chamber toward the intermediate portion thereof.

2. In a machine of the character described, a working chamber, a rotor for working the material back and forth in said chamber, said chamber having provision at the end for the introduction of the material, and means for assisting the movement of the material from the end of the chamber toward the intermediate portion thereof, said means cooperating with said rotor.

3. In a machine of the character described, a mixing chamber, a rotor in said chamber having a blade, said chamber having a charging opening at the end, and means cooperating with the rotor blade for expediting the movement of the material from the end of the chamber toward the middle portion thereof.

4. In a machine of the character described, a mixing chamber, a rotor therein having a blade, said chamber having a charging opening at the end, and means cooperating with the blade for assisting the movement of the material away from the charging opening.

5. In a machine of the character described, a working chamber, a rotor in said chamber which alternately works the material from one end of the chamber to the other, said chamber having provision for the introduction of material at the end thereof, and means for facilitating the inward movement of the material.

6. A rubber treating machine comprising a mixing chamber, a rotor therein having a blade, said chamber having provision for the introduction of material at the end thereof, and means for facilitating and expediting the movement of the material introduced inwardly away from the charging end of the chamber.

7. A rubber treating machine comprising a working chamber, a rotor therein having a blade, said chamber having provision for the introduction of material at the end thereof, and means for facilitating and expediting the movement of the material introduced inwardly away from the charging end of the chamber, said means cooperating with the rotor blade.

8. A rubber treating machine comprising a working chamber, a rotor therein having a blade, said chamber having provision for the introduction of material at the end thereof, and means for facilitating and expediting the movement of the material introduced inwardly away from the charging end of the chamber, said means cooperating with the rotor blade and being associated with the chamber wall.

9. A rubber treating machine comprising a working chamber, a rotor therein having a blade, said chamber having a charging opening at the end adjacent said blade, and means on the chamber wall cooperating with said blade for deflecting the material and expediting its movement away from the charging opening.

10. A rubber treating machine comprising a working chamber, a rotor in said chamber having a blade, said chamber having a charging opening at the end, and a projection on the chamber wall adjacent to and cooperating with the blade for assisting the inward movement of the material away from the charging opening.

11. In a machine of the character described, a working chamber, a rotor in said chamber having a blade, said chamber having a charging opening at the end, and means on the chamber wall adjacent said charging opening and cooperating with the tip of the blade to prevent the incoming material from slipping past the blade and for deflecting the material toward the middle portion of the chamber.

12. In a machine of the character described, a working chamber, a rotor in said chamber having a blade, said chamber having a charging opening at the end, and means on the chamber wall adjacent said charging opening and cooperating with the tip of the blade to prevent the incoming material from slipping past the blade and for deflecting the material toward the middle portion of the chamber, said means on the chamber wall comprising a rib inclined relatively to the blade so as to be traversed by the same at an angle thereto, whereby the material is forced directly away from the charging opening toward the middle portion of the chamber.

13. In a machine of the character descibed, a working chamber, a rotor shaft therein, a blade on said shaft inclined relatively to the shaft axis, said chamber provided at one end with a charging opening, and a rib on the chamber wall adjacent said opening arranged to be traversed by the blade at an angle.

14. In a machine of the character described, a working chamber, a rotor shaft therein, a blade on said shaft inclined relatively to the shaft axis, and a rib on the chamber wall adjacent the tip of the blade arranged at a considerable angle to the blade.

15. In a machine of the character described, a working chamber, a rotor shaft therein, a blade on said shaft inclined relatively to the shaft axis, and a rib on the chamber wall adjacent the tip of the blade arranged approximately at right angles to the blade.

16. In a rubber mixer or like machine, the combination of a working chamber, a swinging closure therefor hinged at one side of the chamber and extending across the median line of the chamber to the other side thereof, and cam means movable transversely of the machine beneath said closure for closing and releasing the same.

17. In a rubber mixer or like machine, the combination of a chamber, a swinging discharge door hinged to the chamber wall at one side of the longitudinal axis of the chamber and adapted to hang by gravity in an open position, said door in the closed position extending past the longitudinal median line of the chamber to the other side thereof, an abutment on the bottom portion of said door extending across the longitudinal median line of the chamber and having an inclined lower face, and cam means cooperating with said face and movable transversely of the chamber beneath the same for controlling the position of said door.

18. In a rubber mixer or like machine, a working chamber, a swinging discharge door therefore hinged to the chamber at the rear side thereof and adapted to hang by gravity in an open position, said door in the closed position extending at its free edge to the front of the chamber so as to engage a portion of the chamber wall, an abutment on the lower face of said door having an inclined lower face, a cam member cooperating with said face, means for moving the cam member transversely of the machine including a transversely arranged threaded spindle, and a hand wheel on said spindle at the front of the machine.

19. In a machine of the character described, a working chamber, a rotor in said chamber which works the material from one end of the chamber to the other, said chamber having a charging opening at one end thereof, and a transversely movable member for closing said charging opening.

20. In a machine of the character described, a working chamber, a rotor in said chamber which works the material from one end of the chamber to the other, said chamber having a charging opening at one end thereof, and a transversely movable slide for closing said charging opening.

21. In a machine of the character described, a working chamber, a rotor therein, a hopper in communication with said chamber having a slanting bottom, and means for closing the communication between the hopper and the chamber and keeping it closed during the operation of the rotor.

22. In a machine of the character described, a working chamber, a rotor in said chamber for working the material from one end of the chamber to the other, said chamber having a charging opening in its end wall, a hopper associated with said opening and having an inclined bottom, and means associated with the hopper for cutting off communication between the same and said chamber.

23. In a machine of the character described, a working chamber, a rotor in said chamber which alternately works the material from one end of the chamber to the other, said chamber having a head with a charging opening therein, a hopper integral with the head in direct communication with the chamber by way of said opening, and means for closing said opening.

24. In a machine of the character described, a working chamber, a rotor in said chamber which alternately works the material from one end of the chamber to the other, said chamber having a head with a charging opening therein, a hopper integral with the head in direct communication with the chamber by way of said opening, and means for closing said opening, comprising a closure member movable transversely to the rotor axis.

25. In a machine of the character described, a working chamber, a rotor therein for working the material back and forth, said chamber having a head at one end with a charging opening therein, a hopper on said head, and a movable partition associated with the hopper, which, when moved to the inoperative position, permits material to pass directly from the hopper into the chamber.

26. In a machine of the character described, a working chamber, a rotor therein for moving the material back and forth, said chamber having a head with an opening therein for the introduction of the material, a hopper on said head adapted to communicate with said opening, and means for controlling such communication.

27. In a machine of the character described, a working chamber, a rotor therein for working the material back and forth, said chamber having an opening at one end for the introduction of material, a hopper in line with said opening, and a movable closure for said opening adapted to be moved out of the way when the hopper is filled with material to permit the passage of such material into said chamber.

28. In a machine of the character described, a working chamber, a rotor therein for working the material back and forth, said chamber having an opening at the end through which material to be mixed is introduced in a direction generally lengthwise of the rotor shaft, a charge container in direct and free communication with said working chamber by way of said opening, and a transversely movable member for closing said opening during the mixing operation.

29. In a machine of the character described, a working chamber, a rotor therein for working the material back and forth, a charge container at the end of the working chamber in communication with the latter, and means for closing the working chamber during mixing without interfering with the filling of the charge container.

30. In a machine of the character described, a working chamber, a rotor therein, said chamber having a head with an opening therein for the introduction of the material, a charge container in direct communication with said working chamber by way of said opening, and a transversely movable slide member for cutting off communication between the working chamber and the charge container.

31. In a machine of the character described, a working chamber, a rotor therein, a feed hopper by means of which the chamber is charged, and a transversely movable member associated with the hopper for cutting off communication between the chamber and hopper during the operation of the rotor, said means movable entirely out of the way of the material in the hopper to permit the same to pass freely into the chamber.

32. In a rubber mixer or like machine, a working chamber, a swinging closure therefor normally hanging in open position, cam members to engage said closure at different points and means for operating said cam members simultaneously.

33. In a rubber mixer or like machine, a working chamber, having a swinging closure, cam members movable into engagement with said closure at different points in its length, to move it into the closed position and means including interconnected threaded spindles for operating said cam members simultaneously.

34. In a machine of the class described, a working chamber, a hopper in communication with the end thereof and a bodily and vertically slidable element for cutting off said communication.

35. In a machine of the character described, a working chamber, a rotor therein for working the material in opposite directions in said chamber, a hopper communicating with the chamber and a closure slidable into position to close off said hopper from the chamber.

36. In a machine of the character described, a working chamber, a rotor therein, provided with blades to work the material from the ends of the chamber toward the center thereof in opposite directions, a hopper in communication with the chamber at the end thereof, and means movable into position to close the communication between said hopper and chamber.

37. In a rubber mixer or like machine, a working chamber, a swinging closure therefor normally hanging in open position, a rod mounted for translatory movement below said closure member, cam members on said rod to engage the closure at different points along its length, and means for moving the rod to operate said cam members to control the closure member.

38. In a rubber mixer or like machine, a mixing chamber, a swinging discharge door therefor having an inclined abutment on its lower face, a rod mounted for translatory movement below said door, a roller mounted on said rod and engageable with said abutment to control said door and means to move said rod.

39. In a rubber mixer or like machine, a working chamber, a swinging closure therefor normally hanging in open position, cam members to engage said closure at different points in its length, a rod mounted for translatory movement below said closure and provided with threaded end blocks and interconnected threaded spindles engaging said blocks to move the same, said cam members being carried by said rod.

40. In a device of the character described, a working chamber provided with end frames and a swinging discharge door therebetween, a pair of blocks reciprocably mounted in said frames, a rod connected at each end to one of said blocks and carrying cam means to engage the door to control the same, and means to reciprocate said blocks.

41. In a device of the character described, a working chamber provided with end frames and a swinging discharge door therebetween, a pair of blocks reciprocably mounted in said frames, a rod connected at each end to one of said blocks and carrying rollers to engage the door to control the same, and means to reciprocate said blocks.

42. In a rubber treating machine, a casing having a mixing chamber and means mounted therein for working the material back and forth in the chamber, a wall of the casing having an opening formed laterally therein through which the material may pass into the chamber, said opening being inclined outwardly and having a vertically disposed hopper communicating therewith, and means to cut off the flow of material from the hopper to the chamber.

43. In a rubber treating machine, a casing having a mixing chamber and a rotor therein for working the material back and forth, a hopper communicating with the interior of the casing through an opening in a lateral wall thereof, the bottom of said hopper being inclined to cause the material therein to pass by gravity into said opening and thence into the chamber, and means for cutting off communication between the hopper and the interior of the casing.

44. In a rubber treating machine, a casing having a mixing chamber and a rotor therein for working the material back and forth, a hopper communicating with the interior of the casing through an opening in a lateral wall thereof, the bottom of said hopper being inclined to cause the material therein to pass by gravity into said opening and thence into the chamber, and means for cutting off communication between the hopper and the interior of the casing, said means comprising a member movable vertically along the wall of the casing and closing said communication when in depressed position.

45. In a machine of the character described, a casing having a working chamber, a rotor therein for working the material in opposite directions in said chamber, a hopper mounted adjacent the casing and communicating laterally therewith through a wall of the casing and a closure member downwardly movable into position to close off said hopper from the chamber.

46. In a machine of the character described, a casing having a working chamber, a rotor therein provided with blades to work the material from the ends of the chamber toward the center thereof in opposite directions, a hopper supported adjacent the casing and communicating laterally with the chamber, and means movable into a depressed position to close the communication between said hopper and chamber.

In witness whereof, we have hereunto set our hands on the 8 day of July, 1919.

DAVID R. BOWEN.
CARL F. SCHNUCK.